June 1, 1948. M. V. LOMAX 2,442,423
WIRE WELDING TOOL
Filed Sept. 26, 1946
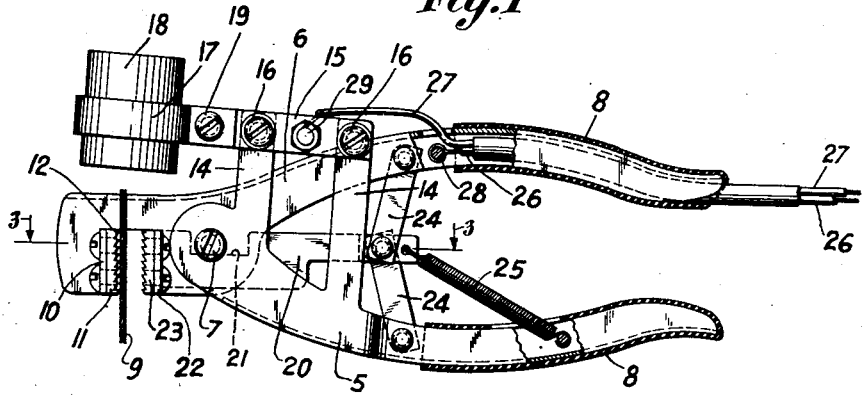
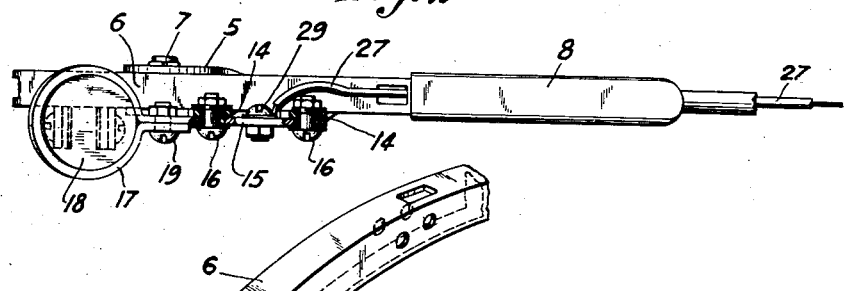
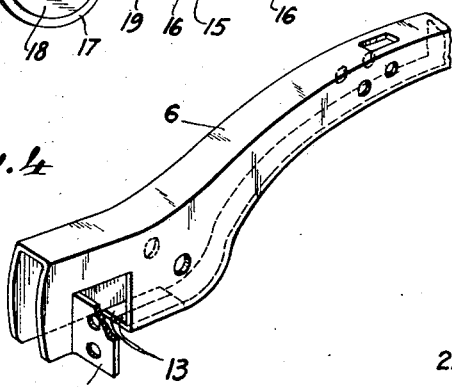
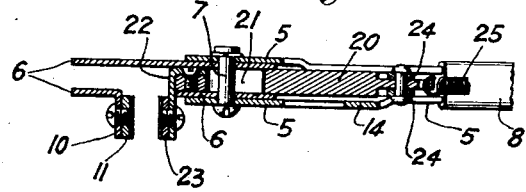
INVENTOR.
Malcomb V. Lomax,
BY
ATTORNEY.

Patented June 1, 1948

2,442,423

UNITED STATES PATENT OFFICE 2,442,423

WIRE WELDING TOOL

Malcomb V. Lomax, Brooklyn, N. Y., assignor to Control Instrument Company, Inc., Brooklyn, N. Y., a corporation of New York Application September 26, 1946, Serial No. 699,553

5 Claims. (Cl. 219—4)

This invention relates to improvements in welding devices and has particular reference to a hand tool for welding wire connections.

When making connections between electrical wires, such as Formvar wire for example, it has heretofore been common practice to first strip the insulation from the end portions of two lengths of wire and, after twisting the same together to secure electrical contact, the terminals are permanently soldered. Due to the toughness of the insulation in the type of wire mentioned, the stripping operation is tedious and time consuming, aside from the possibility of damaging the wire by nicking the same with the stripping tool employed. This nicking of the wire will ofttimes cause it to break when bending. Another method of stripping has been to dip the ends of the wire in acid, but this has been found dangerous to the operator and, unless the acid on the wire is quickly neutralized, it may damage an electrical coil formed of such wire to such extent that it cannot be used.

The present invention is designed to overcome the above difficulties by the provision of a tool for simple and practical construction which obviates the necessity of stripping any insulation from a wire and which effects a positive welding action between the ends of two wires to insure a perfect connection.

Another feature of the invention is the provision of a tool wherein cooperation between two pivotally connected handle members produces the concurrent actions of gripping two or more strands of wire to effect electrical connection between the same and one of said handle members, and of moving a welding electrode into contact with the extremities of said wires to close an electrical circuit to thereby weld said extremities together.

The inventive idea involved is capable of receiving a variety of mechanical expressions one of which, for purposes of illustration, is shown in the accompanying drawing wherein:

Fig. 1 is a side elevation, partly in section, of a tool constructed in accordance with the invention.

Fig. 2 is a top plan view thereof, partly in section.

Fig. 3 is a section on the line 3—3 of Fig. 1, and

Fig. 4 is a fragmentary perspective view of one of the handle members of the tool.

In the preferred embodiment of the invention shown in the drawing, the tool comprises two cooperating members, 5 and 6, which are joined by the pivotal connection 7. The ends of the members 5 and 6 remote from their pivotal connection constitute handle portions each of which is encased in a covering 8 of insulation material, and these handle portions form grips by means of which members 5 and 6 are moved about their pivot 7 to grip the twisted strands of wire 9 while the extremities thereof are being welded, as will appear in the course of the description.

Both members 5 and 6 are of channeled formation and the member 6, as best shown in Fig. 4, adjacent the end thereof opposite its handle portion has one of its walls struck out to provide a flange 10 to which is detachably secured a gripping jaw 11 the face of which is provided with teeth or serrations 12 that, when engaged with the wire 9, will penetrate the insulation thereof without damaging the core. Adjacent the point at which the pivot 7 extends through the member 6, the lower edges of the latter are provided with inturned flanges 13 which combine to form a support for a purpose which will later appear.

The other member 5 of the tool, a portion of which adjacent the pivot 7 extends on opposite sides of the member 6 as shown in Fig. 3, is provided with two spaced arms 14 which extend laterally from the member and transversely across the member 6. A bracket 15, formed of an elongated strip of material, is secured adjacent one end to the free extremities of the arms 14 by means of the small bolts 16, and suitable insulation is provided around said bolts to insulate the bracket 15 from said arms. The other end of the bracket 15 is bent to form a holder 17 for receiving an electrode 18 such as a carbon resistance element, and this electrode is retained in the holder by tightening the bolt 19. The electrode 18 is positioned adjacent the point where the wires 9 are gripped so that when pressure is exerted upon the handle portions of the members 5 and 6 to move the same about their pivot connection said electrode will be swung toward the extremities of the twisted wires 9 and ultimately come into contact therewith.

A slide 20 cooperates with the members 5 and 6 and is mounted so that an intermediate portion thereof will extend between the walls of the member 6 and rest upon the supporting flanges 13 for sliding movement relative thereto. Said intermediate portion of the slide is provided in its upper edge with a recess 21 to receive the pivot 7, with the bottom edge of said recess engaging said pivot so that the slide will be guided in its movements between said pivot and flanges. To one end of the slide 20 there is secured an angle plate 22 to which is attached the movable gripping jaw 23 of the same construction as the jaw 11, and these jaws cooperate to grip the wires 9 as the electrode 18 approaches the extremities thereof. The other end of the slide 20 is pivotally connected to the members 5 and 6 by the links 24 which cooperate to move the slide and its jaw 23 toward the relatively fixed jaw 11 when the handle portions of the members 5 and 6 are brought together. This movement of the slide 20 is against the action of a retractile spring 25 one end of which is connected to the slide 20 while its other end is secured to the member 5. When the handle portions of said members 5, 6 are released after a welding operation, the spring 25 becomes effective to restore the parts to the position shown in Fig. 1.

To secure a welding action upon the extremities of the wires 9 when the electrode 18 comes into contact therewith, an electrical circuit is provided which consists of the two conductors 26 and 27 that are connected to a source of current through a step-down transformer (not shown). Said conductors extend through the channel of the member 6 and the conductor 26 is grounded on said member at 28 while the conductor 27 is extended through said member and secured to the bracket 15 at 29. When the wires 9 have been gripped by the jaws 11, 23 the teeth of which penetrate the insulation of said wires sufficiently to cause an electrical contact, and the electrode engages the extremities of said wires, the electrical circuit is completed through the conductors 26, 27 to produce a welding action upon said wire extremities which will permanently secure them together.

What is claimed is:

1. In a tool for welding the extremities of electrical conducting wires, cooperating movable members having jaws which are relatively adjustable for gripping said wires adjacent their extremities, an electrode mounted on one of said members for movement therewith in one direction toward the extremities of said wires to establish contact with the same, and means operated by the movement of said members to adjust one of said jaws relative to the other in a direction transverse to the movement of said electrode when gripping said wires adjacent their extremities.

2. In a tool for welding electrical conducting wires and the like, relatively movable members one of which is provided with a jaw, an electrode and holder therefor mounted on the other member, a second jaw movable relative to the first named jaw for cooperation therewith to grip said wires to make electrical contact therewith, and means controlled by a relative movement of said members for adjusting said movable jaw into wire gripping relation with said fixed jaw, said relative movement also bringing said electrode into electrical contact with said wires.

3. In a tool for welding electrical conducting wires and the like, relatively movable members one of which is provided with a jaw, spaced supporting arms extending laterally from the other member, a holder secured to said arms, an electrode mounted in said holder for movement toward said jaw when said members are moved about their pivot, a second jaw supported by the first named member for sliding movement relative thereto and to the first named jaw for cooperation with the latter to grip said wires as said electrode is moved toward the first named jaw, and means connecting said relatively movable members to said second jaw for sliding same.

4. In a tool for welding electrical conducting wires and the like, pivotally connected members one of which is provided with a jaw at one end and which is of channeled formation with the portion of said member adjacent said pivotal connection formed to provide a support, an electrode and holder therefor mounted on the other pivot member and movable therewith towards said jaw, a sliding element movable in the channel of the first named member between said support and the pivot of said members so as to be guided in its movement thereby, said sliding element having a second jaw cooperating with the first named jaw to grip said wires therebetween to hold them for contact with said electrode, and means controlled by said members when they are moved about their pivot for sliding said element.

5. In a tool for welding electrical conducting wires and the like, pivotally connected members one of which is provided with a jaw at one end and which is of channeled formation with the portion of said member adjacent said pivotal connection formed to provide a support, spaced supporting arms extending laterally from the other member, a holder secured to said arms, an electrode mounted in said holder for movement with said other member and toward said jaw when said members are moved about their pivot, a sliding element movable in the channel of the first named member between said support and the pivot of said members so as to be guided in its movements thereby, said sliding element having a second jaw cooperating with the first named jaw to grip said wires therebetween to hold them for contact with said electrode, and means controlled by said members when they are moved about their pivot for sliding said element.

MALCOMB V. LOMAX.

REFERENCES CITED

The following references are of record in the file of this patent:

UNITED STATES PATENTS

| Number | Name | Date |
|---|---|---|
| 1,884,222 | Ragsdale | Oct. 25, 1932 |